United States Patent [19]

Yuki et al.

[11] Patent Number: 5,418,655
[45] Date of Patent: May 23, 1995

[54] RECORDING AND REPRODUCING APPARATUS FOR RECORDING A PROGRAM START SIGNAL

[75] Inventors: Yoichi Yuki; Takeshige Hamamoto, both of Higashihiroshima, Japan

[73] Assignee: Sharp Kabushiki Kaisha, Osaka, Japan

[21] Appl. No.: 308,961

[22] Filed: Sep. 20, 1994

Related U.S. Application Data

[63] Continuation of Ser. No. 674,446, Mar. 25, 1991, abandoned.

[30] Foreign Application Priority Data

Mar. 27, 1990 [JP] Japan ................................. 2-80077
Mar. 27, 1990 [JP] Japan ................................. 2-80078
Mar. 27, 1990 [JP] Japan ................................. 2-80079
Mar. 27, 1990 [JP] Japan ................................. 2-80090

[51] Int. Cl.⁶ ............................................. G11B 15/18
[52] U.S. Cl. ..................................... 360/13; 360/72.2; 360/27; 369/83
[58] Field of Search .................... 360/72.2, 13, 14.2, 360/14.3, 48, 27; 369/83; 358/311

[56] References Cited

U.S. PATENT DOCUMENTS

4,122,500 10/1978 Bradford et al. .
4,688,116 8/1987 Takahashi et al. ............. 360/72.2
4,821,128 4/1989 Inazawa et al. ............... 360/72.2
4,992,892 2/1991 Yamada et al. ................. 360/27

FOREIGN PATENT DOCUMENTS

2810984 9/1978 Germany .
3905623A1 9/1989 Germany .
61-258357 11/1986 Japan .
64-43839 2/1989 Japan .
2-14449 1/1990 Japan .
2224387 5/1990 United Kingdom .

*Primary Examiner*—Georgia Y. Epps
*Assistant Examiner*—P. W. Huber

[57] ABSTRACT

In a magnetic recording and reproducing apparatus such as DAT, when recording an acoustic signal which is a series of recording information on a magnetic tape, a program start signal is recorded automatically at the start of recording. This program start signal indicates a program recording start position on an acoustic signal or the like. This program start signal can be additionally recorded in a magnetic tape in which a program has been already recorded. When the program start signal record button is pressed while reproducing the magnetic tape, plural recording areas including the recording area which has been reproduced at the time of pressing are reproduced repeatedly. A recording area to be recorded additionally may be arbitrarily specified in such plural recording areas being reproduced repeatedly. The front-rear relation of the specified recording area may be confirmed by lighting an indicator or by the change of reproduction level during repetitive reproduction action. Therefore, the program start signal may be easily and accurately recorded in the recording area desired by the operator.

7 Claims, 8 Drawing Sheets

RECORDING AND REPRODUCING APPARATUS FOR RECORDING A PROGRAM START SIGNAL

This application is a continuation of application Ser. No. 07/674,446 filed on Mar. 25, 1991, now abandoned.

BACKGROUND OF THE INVENTION

1. Field of the Invention

The present invention relates to a recording and reproducing apparatus capable of recording control information, such as a program start signal to show the beginning (head) position of a program, as series of recorded information in a specific recording area of recording medium.

2. Description of the Background Art

A magnetic recording and reproducing apparatus of rotary head type called a rotary-digital audio tape recorder (R-DAT) has been hitherto known. In such apparatus, a recording signal such as an acoustic signal is pulse-code modulated (PCM), and is recorded in a recording area called a PCM Area, while a program start signal, program number, time information and others called Sub-codes are recorded in a recording area called a Sub-code Area on a magnetic tape. When reproducing the magnetic tape or when running at high speed, the program number and reproducing time may be known by reading out these Sub-codes, or the beginning of a program may be detected. The program is a series of recorded information, and in the case of music, for example, one tune is one program.

The program start signal is designed to be recorded automatically upon start of recording, generally, when recording music or a program. Also, by pressing the program start signal record button in the midst of recording a program, the program start signal is recorded at the moment of pressing the button. It may be, meanwhile, sometimes desired to record additionally the program start signal after recording the program such as, for example, in the case of dividing a long program. When, for instance, a concert is recorded, the recording time is several hours along, and plural tunes are recorded consecutively, and by recording a program start signal at the beginning of each tune, the beginning of a desired tune may be easily detected.

For such additional recording of a program start signal, the program start signal is recorded for a specific time in the Sub-code Area, without changing the recording area called the PCM area in which the acoustic signals and other program signals are recorded. In the conventional R-DAT, when additionally recording the program start signal, the following methods are executed.

1. The vicinity of the desired insert position of program start signal is reproduced, and the program start signal record button is pressed at the desired insert position, then the program start signal is recorded from the pressed moment.
2. The vicinity of the desired insert position of the program start signal is reproduced, and the pause button is pressed at the desired insert position, thereby a pause state is set. In succession, the program start signal record button is pressed, and the program start signal is recorded from the position of the pause state.
3. The vicinity of the desired insert position of program start signal is reproduced, and the program start signal record button is pressed at the desired insert position, then the recording areas are reproduced repeatedly in a predetermined number from the pressed position. This repetitive reproducing section may be moved in the reproducing direction of the magnetic tape or in the reverse direction, and when the same button is pressed again after moving, the program start signal is recorded from the beginning position of the repetitive reproducing section.

In the R-DAT executing the above methods, in method 1, the program start signal record button is pressed after hearing the desired position, then the program start signal is recorded, and there occurs a deviation between the actual recording position and the desired position due to the delay of the response time by the operator.

In method 2, the program start signal can be exactly recorded from the pause position, but it is relatively difficult to pause at the desired position. Besides, since the acoustic signal capable of recognition as a continuous signal is paused, the front-rear relation of the paused position is hard to understand.

In method 3, by reproducing repeatedly and by moving in the repetitive reproducing section, the problems of methods 1 and 2 have been solved. However, since the program start signal is recorded from the beginning position of the repetitive reproducing section, it is hard to understand the relation between the planned recording position of the program start signal and its preceding position.

SUMMARY OF THE INVENTION

It is hence a primary object of the invention to present a recording and reproducing apparatus capable of making it easier to set a planned recording area of specific control information such as program start signal by clearly showing the front-rear relation of the planned recording area, checking the planned recording area, and recording the program start signal in a desired recording area easily and accurately.

To achieve the above object, the invention presents a recording and reproducing apparatus for setting recording areas in a predetermined sequence in a recording medium, and recording the recording information and control information in every recording area, which comprises:

- means for reading the recording information and control information,
- means for recording predetermined specific control information,
- means for setting a planned recording area of the predetermined specific control information,
- means for storing the planned recording area on the basis of the outputs from the reading means and setting means, and
- means for correcting the planned recording area,
- wherein when the setting means is manipulated during reproduction of the recording medium, the recording area having been reproduced at the time of manipulation is set as the planned recording area, and the planned recording area is stored in the storing means, and the recording areas are repeatedly reproduced in a predetermined number including the planned recording area, and when the setting means is manipulated again, the predetermined specific control information is recorded from the planned recording area.

According to the invention, when the setting means is manipulated during reproduction of the recording medium, the recording area being reproduced at the time of manipulation is set as the planned recording area, and this planned recording area is stored in the storing means, and the recording areas are reproduced repeatedly in a predetermined number including the planned recording area. This repetitive reproducing action is repeatedly executed, and therefore the planned recording area can be confirmed.

Here, if the planned recording area of the predetermined specific control information is not matched with the desired position by the operator, the correcting means is manipulated to correct the planned recording area. Along with this correction, the planned recording area for storing in the storing means is changed. Afterwards, when the setting means is manipulated again, the predetermined specific control information is recorded for a predetermined time from the planned recording area stored in the storing means.

Therefore, when additionally recording the predetermined specific control information, the recording areas of a predetermined number before and after and including the initially set planned recording area are repeatedly reproduced, so that the positional relation of the planned recording area may be clearly recognized. As a result, the planned recording area may be easily corrected by the correcting means, and the predetermined specific control information may be recorded at the operator's desired position accurately.

Thus, according to the invention, when additionally recording the predetermined specific control information, since the recording areas of a predetermined number before and after and including the initially set planned recording area are repeatedly reproduced, the configuration of the planned recording area may be clearly recognized. Hence, the planned recording area may be corrected easily by the correcting means, and the predetermined specific control information may be accurately recorded at the position desired by the operator.

The invention further presents a recording and reproducing apparatus for setting recording areas in a predetermined sequence in a recording medium and for recording the recording information and control information in every recording area, which comprises:
means for reading the recording information and control information,
means for recording predetermined specific control information,
means for setting a planned recording area of the predetermined specific control information,
means for storing the planned recording area on the basis of the outputs from the reading means and setting means,
means for correcting the planned recording area, and
means for displaying the planned recording area,
wherein when the setting means is manipulated during reproduction of the recording medium, the recording area having been reproduced at the time of manipulation is set as the planned recording area, and the planned recording area is stored in the storing means, and the recording areas are repeatedly reproduced in a predetermined number including the planned recording area, while the planned recording area is displayed in the displaying means, and the predetermined specific control information is recorded from the planned recording area when the setting means is manipulated again.

According to the invention, when the setting means is manipulated during reproduction of the recording medium, the recording area being reproduced at the time of manipulation is set as the planned recording area, and this planned recording area is stored in the storing means, and the recording areas are repeatedly reproduced in a predetermined number including the planned recording area.

At this time of repetitive reproductions, the information showing the planned recording area is being shown in the display means. The display means is composed of, for example, light-emitting diodes, and the light-emitting diodes may be illuminated at the time of reproduction of the planned recording area. The light-emitting diodes may be also illuminated in the reproduction period after the planned recording area.

Here, if the planned recording area of the predetermined specific control information is not matched with the recording area desired by the operator, the planned recording area is corrected by the manipulation of the correcting means. As a result, the planned recording area of the storing means is revised, and the display state of the display means changes accordingly.

Afterwards, when the setting means is manipulated again, the predetermined specific control information is recorded from the planned recording area stored in the storing means.

Therefore, when additionally recording the predetermined specific control information, the recording areas are repeatedly reproduced in a predetermined number before and after and including the initially set planned recording area, and the planned recording area is displayed in the display means, so that the configuration of the planned recording area on the recording medium may be clearly recognized. Hence, the planned recording area may be easily corrected by the correcting means, and the predetermined specific control information may be recorded in the recording area desired by the operator accurately.

Thus, according to the invention, when additionally recording the predetermined specific control information, the recording areas before and after and including the initially set planned recording area are repeatedly reproduced, and the planned recording area is displayed in the display means, so that the configuration of the planned recording area on the recording medium may be clearly recognized. Hence, the planned recording area may be easily corrected by the correcting means, and the predetermined specific control information may be recorded in the position desired by the operator accurately.

The invention moreover presents a recording and reproducing apparatus for setting recording areas in a predetermined sequence in a recording medium, and recording the recording information and control information in every recording area, which comprises:
means for reading the recording information and control information,
means for recording predetermined specific control information,
means for setting a planned recording area of the predetermined specific control information,
means for storing the planned recording area on the basis of the outputs from the reading means and setting means,
means for correcting the planned recording area, means for displaying the planned recording area, and
means for outputting the recording information from the reading means, with the output level being variable,
wherein when the setting means is manipulated during reproduction of the recording medium, the recording area being reproduced at the time of manipulation is set as the planned recording area, and this planned recording area is stored in the storing means, and the recording areas are repeatedly reproduced in a predetermined number including the planned recording area, while the planned recording area is displayed in the display means, and the output level of the information in the planned recording area is delivered as varying so as to be different from the output level of the information in the other recording areas, and the predetermined specific control information is recorded from the planned recording area when the setting means is manipulated again.

According to the invention, when the setting means is manipulated during reproduction of the recording medium, the recording area being reproduced at the time of manipulation is set as the planned recording area, and the planned recording area is stored in the storing means, and the recording areas are repeatedly reproduced in a predetermined number including the planned recording area.

In these repetitive reproductions, the planned recording area is displayed in the display means. The display means is composed of, for example, light-emitting diodes, and the light-emitting diodes may be illuminated when reproducing the planned recording area, or the light-emitting diodes may be illuminated during the reproduction period after the planned recording area.

Furthermore, in this repetitive reproduction, the output level of the information of the planned recording area is different from the output level of the information in the other recording areas.

Here, unless the planned recording area of the predetermined specific control information is matched with the position desired by the operator, the planned recording area is corrected by the manipulation of the correction means. As a result, the planned recording area of the storing means is changed. By this correction, the display state of the display means also varies, and the information delivered at different output levels is also changed.

Afterwards, when the setting means is manipulated again, the predetermined specific control information is recorded from the planned recording area stored in the storing means for a predetermined time.

Therefore, when additionally recording the predetermined specific control information, the recording areas are repeatedly reproduced in a predetermined number before and after and including the initially set planned recording area, and the planned recording area is displayed in the display means, and the information of the planned recording area is delivered at an output level different from the output level of the information in the other recording areas, so that the configuration of the planned recording area my be clearly recognized. Accordingly, the planned recording area may be easily corrected by the correcting means, and the predetermined specific control information may be recorded at the position desired by the operator accurately.

Thus, according to the invention, when recording the additional predetermined specific control information, the recording areas are repeatedly reproduced in a predetermined number before and after and including the initially set planned recording area, and the planned recording area is displayed in the display means, and the information of the planned recording area is delivered at an output level different from the output level of the information in the other recording areas, so that the configuration of the planned recording area may be clearly recognized. Accordingly, the planned recording area may be easily corrected by the correcting means, and the predetermined specific control information may be recorded at the position desired by the operator accurately.

The invention further presents a recording and reproducing apparatus for setting recording areas in a predetermined sequence in a recording medium, and recording the recording information and control information in every recording area which comprises:
means for reading the recording information and control information,
means for recording predetermined specific control information,
means for setting a planned recording area of the predetermined specific control information,
means for storing the planned recording area on the basis of the outputs from the reading means and setting means, and
means for correcting the planned recording area,
wherein when the setting means is manipulated during reproduction of the recording medium, the recording areas are repeatedly reproduced in a specified number including the recording area being reproduced at the time of manipulation, and when the setting means is manipulated the second time, the recording area being reproduced at the time of manipulation is set as a planned recording area, and this planned recording area is stored in the storing means, and when the setting means is manipulated the third time, the predetermined specific control information is recorded from the planned recording area.

According to the invention, when the setting means is manipulated during reproduction of the recording medium, the recording areas are repeatedly reproduced in a predetermined number including the recording area being reproduced at the time of manipulation, and when the setting means is manipulated again during this repeated reproduction, the recording area being reproduced at the time of manipulation is set as a planned recording area, and this planned recording area is stored in the storing means.

Here, unless the planned recording area of the control information is matched with the position desired by the operator, the planned recording area is corrected by the correcting means. Afterwards, when the setting means is manipulated once again, the predetermined specific control information is recorded from the planned recording area for a predetermined time.

Therefore, when additionally recording the predetermined specific control information, the recording areas are repeatedly reproduced in a predetermined number including the planned recording area desired by the operator, and when the setting means is manipulated during this repeated reproduction, the recording area being reproduced at the time of manipulation is set as a planned recording area. After setting the planned recording area, the repeated reproduction action continues repeatedly, and the configuration of the planned recording area may be clearly recognized. As a result, the planned recording area may be corrected easily by the correcting means, and the predetermined specific control information may be recorded at the position desired by the operator accurately.

In an embodiment of the recording and reproducing apparatus of the invention, the display means comprises a light emitting element, and this light emitting element is lit only when the planned recording area is reproduced during the repetitive reproduction.

In a further embodiment of the recording and reproducing apparatus of the invention, the display means comprises a light emitting element, and this light emitting element is lit during reproduction of the section after the planned recording area, during the repetitive reproduction.

In a different embodiment of the recording and reproducing apparatus of the invention, the control information includes the identification information for distinguishing the recording areas, and the identification information of the set planned recording area is stored in the storing means.

In a further different embodiment of the recording and reproducing apparatus of the invention, the correcting means comprises a feed button for moving the planned recording area in the reproducing direction of the recording medium, and a return button for moving the planned recording area in the reverse direction of the reproducing direction of the recording medium, and when the feed button or return button is pressed, the planned recording area is moved in the reproducing direction or in the reverse direction of the reproducing direction by a predetermined number of recording areas.

In another embodiment of the recording and reproducing apparatus of the invention, the recording medium is a magnetic tape, in which the recording information and control information are recorded/reproduced by the helical scanning system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

Other and further objects, features, and advantages of the invention will be more explicit from the following detailed description taken with reference to the accompanying drawings which are given by way of illustration only, and thus are not limitative of the present invention, and wherein.

DETAILED DESCRIPTION OF THE PREFERRED EMBODIMENTS

Now referring to the drawing, preferred embodiments of the invention are described below.

Figure 1:
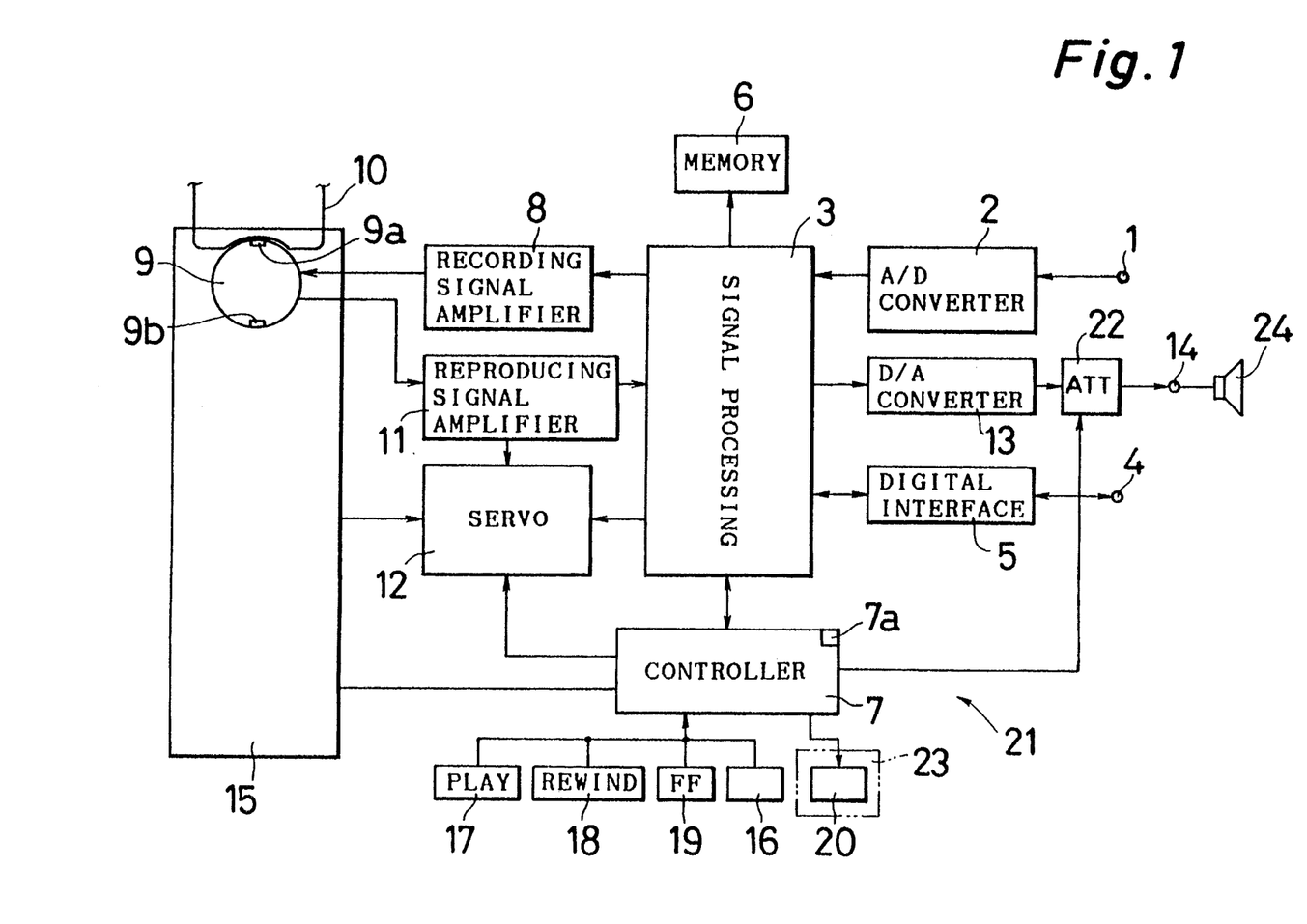
FIG. 1 is a block diagram of a magnetic recording and reproducing apparatus of an embodiment of the invention.

FIG. 1 is a block diagram showing the basic composition of a magnetic recording and reproducing apparatus 21 of an embodiment of the invention. An analog signal fed from a recording input terminal 1 passes through a low pass filter, and is converted into a digital signal in an analog/digital converter (A/D converter) 2, and is input into a signal processing circuit 3. In the case of digital recording, the digital signal from a digital input terminal 4 is sent to the signal processing circuit 3 through a digital interface 5. The signal entering the signal processing circuit 3 is then stored in a memory 6.

The signal processing circuit 3 calculates the parity check codes of two systems of C1 and C2 parity for the stored data, and these parity check codes are also written into the memory 6. On the other hand, Sub-code information such as a program start signal and program number sent from a controller 7 are also written into the memory 6. The signal processing circuit 3 sequentially reads out the data written in the memory 6 when magnetic heads 9a, 9b mounted on a rotary drum 9 trace the surface of a magnetic tape 10, and converts the 8-bit data into 10-bit data by 8-10 conversion, and delivers the data with a synchronizing signal or ATF (automatic track following) signal. The delivered data is amplified by a recording signal amplifier 8, and is recorded in the magnetic tape 10 by the magnetic heads 9a, 9b mounted on the rotary drum 9.

During reproduction, the signal read out by the magnetic heads 9a, 9b is amplified by a reproducing signal amplifier 11, and is converted into a signal of signal level "1" signal level "0" by a comparator, and is supplied to the signal processing circuit 3 using a reproducing clock PLL (phase locked loop). From the data signal supplied to the signal processing circuit 3, the synchronizing signal is detected, and the 10-bit data is converted into an 8-bit data by 8-10 reverse conversion, and is written into the memory 6. On the other hand, the ATF signal is supplied to a servo circuit 12.

The signal processing circuit 3 detects an error of the delivered data, corrects the error, interleaves and deinterleaves, and delivers the processed data to a digital/analog converter (D/A converter) 13 and digital interface 5. The signal passing through the D/A converter 13 is converted into an analog signal, and is delivered from a reproducing output terminal 14 through a low pass filter and attenuating circuit 22. The attenuating circuit 22 adjusts the signal level according to the control signal from the controller 7.

The Sub-code data is applied to the controller 7, and the program number and time code are displayed in a display device 23, and they are also used as various control data. The ATF signal and the detected information from the sensors of a driving device 15 are fed into the servo circuit 12, and various motors are controlled. The driving device 15 controls the running, such as reproduction and fast forwarding, of the magnetic tape 10 according to the control signal from the controller 7.

The controller 7 comprises a plurality of operation buttons for various manipulations. The drawing shows only a program start signal record button 16, play button 17, rewind button 18 and fast forward button 19 which are particularly related with the invention. Besides, to show the state during operation of the magnetic recording and reproducing apparatus 21, a display device 23 is included. The drawing shows only the program start signal record indicator (hereinafter called indicator) 20.

The driving device 15 is composed of the rotary drum 9 on which the magnetic heads 9a, 9b are mounted, a plurality of motors for running the tape, and various sensors. The servo circuit 12 controls the motors for actuating the reproduction, fast forwarding, rewinding and other running actions of the magnetic tape 10.

Figure 2:
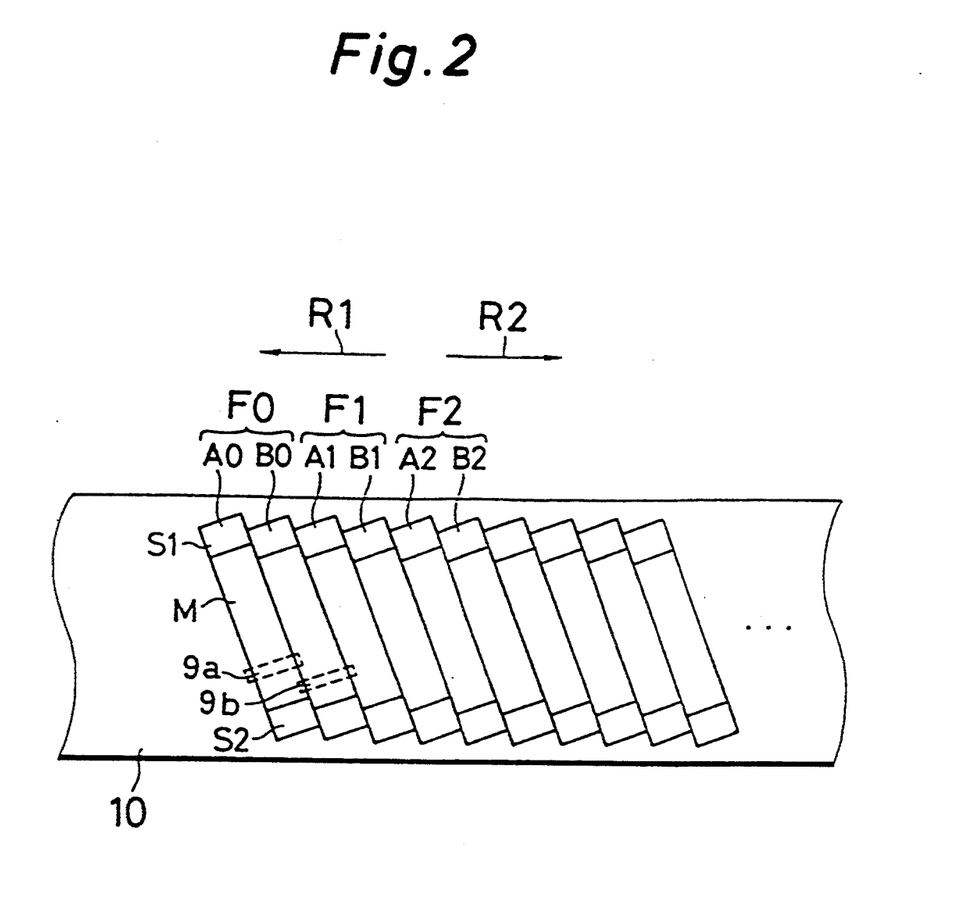
FIG. 2 is a track pattern diagram of a magnetic tape.

FIG. 2 is a diagram showing the track pattern of the magnetic tape 10 recorded by the magnetic recording and reproducing apparatus 21 of the rotary head type. Tracks A0, A1, A2,—are portions recorded by the magnetic head 9a, and these tracks A0, A1, A2,—are read out by the magnetic head 9a. Tracks B0, B1, B2,—are the portions recorded by the magnetic head 9b, and these tracks B0, B1, B2,—are read out by the magnetic head 9b. The track A0 is divided into PCM Area M and Sub-code Areas S1, S2. In the PCM Area M, for example, acoustic signal and identification information such as frame address are recorded, and in the Sub-code Areas S1, S2, for example, a program start signal is recorded. The frame address is, meanwhile, a sequential number incremented by "1" for each successive frame, for example, at the time of recording.

The Sub-code Area S1 is subdivided into plural areas, and the same data is recorded in each area. The Sub-code Area S2 stores the same data as the Sub-code Area S1. Therefore, if the magnetic tape 10 runs at a speed several times to several dozen times faster than the regular running speed in the ordinary running direction (arrow R1 direction) or reverse direction (arrow R2 direction), the Sub-code Areas S1, S2 can be read. The tracks A1, A2,—, and tracks B0, B1, B2,—are composed same as the track A0. A track Ai (i=0, 1, 2,—) and a track Bi make up a frame Fi. Hereinafter, the recording area denotes a frame.

Figure 3:
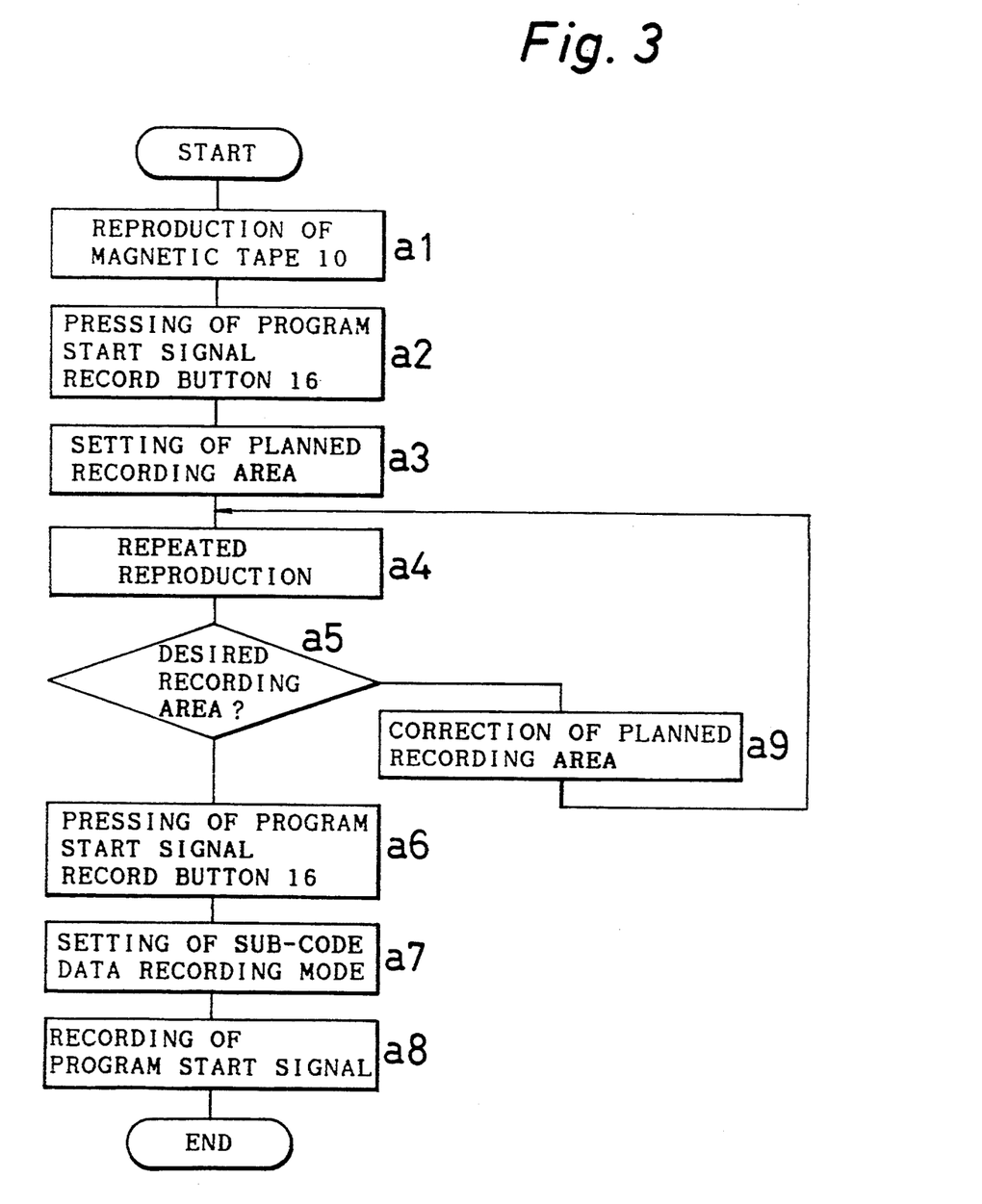
FIG. 3 is a flowchart for explaining the recording action of a program start signal.

FIG. 3 is a flowchart for explaining the recording of the program start signal. At step a1, a cassette tape in which the program start signal is desired to be recorded therein is set in the magnetic recording and reproducing apparatus 21, and the play button 17 is pressed. As a result, the controller 7 controls the servo circuit 12 and driving device 15, and the data recorded on the magnetic tape 10 is reproduced. When the magnetic tape 10 is set in the reproduction state, the acoustic signal delivered from the reproduction output terminal 14 is monitored, for example, by a loudspeaker 24.

At step a2, when the portion in which the program start signal is desired to be recorded therein is reproduced, the program start signal record button 16 is pressed. At step a3, the controller 7 sets the recording area reproduced at the time of pressing of the program start signal record button 16 as the planned recording area of the program start signal, and the frame address which is the identification information of this planned recording area is stored in the memory 7a in the controller 7.

At step a4, in order to reproduce repeatedly the recording areas a predetermined number of times, including the planned recording area, for example to reproduce repeatedly the recording areas corresponding to 3 seconds before and after the planned recording area, the servo circuit 12 and driving device 15 are controlled. During this repetitive reproduction, the controller 7 lights the indicator 20 when reproducing the planned recording area according to the identification information stored in the memory 7a, and shuts it off when the repetitive reproducing section is completed. Such repetitive reproduction action is executed repeatedly, and the operator can recognize the planned recording area while monitoring the reproduction signal and observing the indicator 20.

At step a5, when the set planned recording area is the recording area desired by the operator, the operation advances to step a6, and the program start signal record button 16 is pressed again. At step a7, the controller 7 sets the recording mode of the Sub-code data, and controls the signal processing circuit 3 and driving device 15 for recording the Sub-code data. At step a8, from the planned recording area of the magnetic tape 10, the program start signal is recorded for a specific time, that is, in a predetermined number of recording areas.

At step a5, on the other hand, when the set planned recording area is different from the recording area desired by the operator, the planned recording area is changed at step a9. The planned recording area may be changed freely within the repetitive reproduction section.

For example, when it is desired to move the planned recording area of the program start signal in the forward direction (the direction indicated by arrow R1 in FIG. 5), the rewind button 18 is pressed during the repetitive reproduction. Here, the controller 7 recognizes the rewind button 18 as the button for moving and setting the planned recording area of the program start signal in the forward direction, and every time this rewind button 18 is pressed, the planned recording area is shifted forward by a specific time, for example, by a number of recording areas corresponding to 0.3 second, and the corresponding identification information is stored in the memory 7a. Therefore, when the rewind button 18 is pressed plural times, it is possible to move the planned recording area the moving time corresponding to the number of times rewind button 18 is pressed (in this case, 0.3 second×number of times). As a result of this manipulation, the planned recording area of the program start signal is moved in the forward direction and set, and the lighting timing of the indicator 20 is moved ahead from before change.

When it is desired to move the planned recording area of the program start signal in the backward direction (the direction indicated by arrow R2 in FIG. 5), the fast forward button 19 is used. In this case, too, by the same action as of the rewind button 18, the planned recording area is moved in the backward direction.

After moving the planned recording area, returning to step a4, the repetitive reproduction is resumed, and it is checked, at step a5, whether the recording area is as desired or not. In this way, by moving back and forth over the planned recording area of the program start signal, it may be matched with the recording area desired by the operator. Later, at step a6, by pressing the program start signal record button 16, the program start signal is recorded in the magnetic tape 10 same as before.

Figure 4:
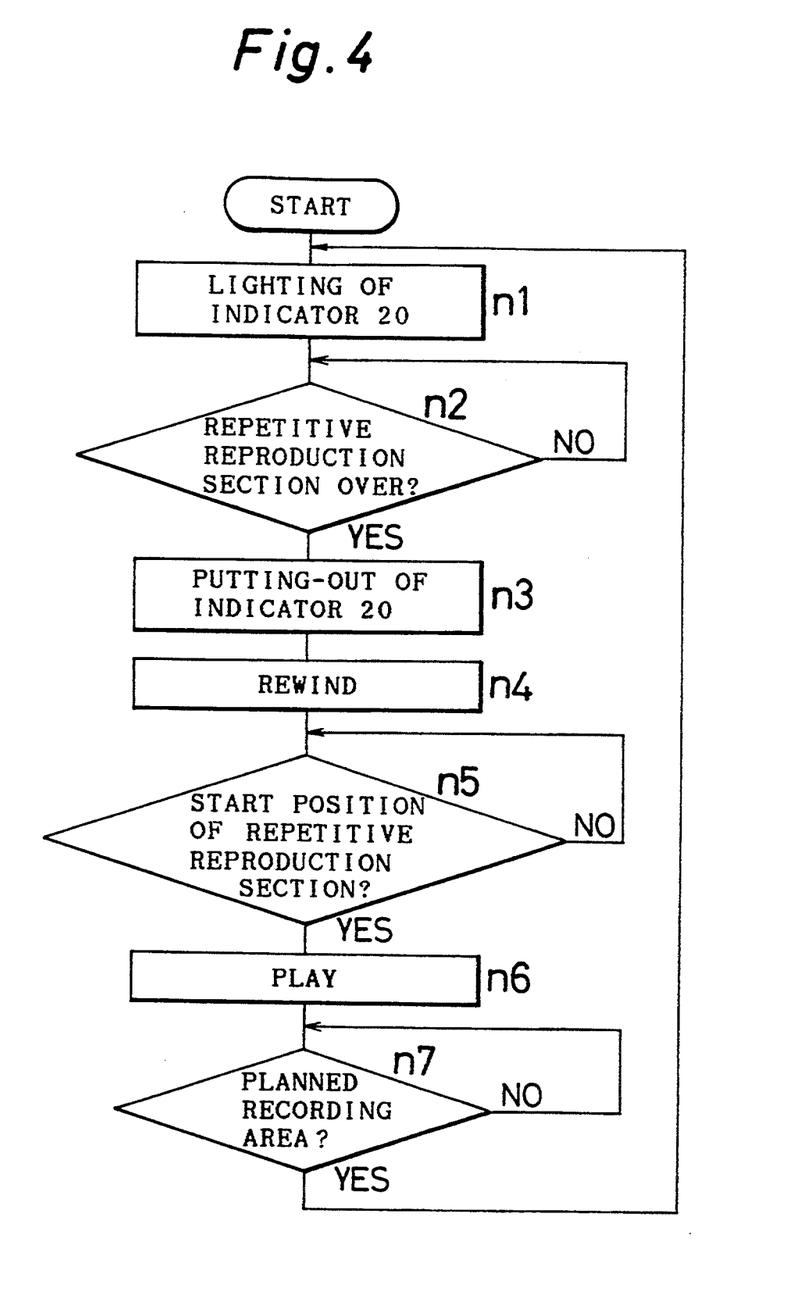
FIG. 4 is a flowchart for explaining the repetitive reproducing action.

FIG. 4 is a flowchart for explaining the repetitive reproduction action at step a4 in FIG. 3. During reproduction of the recorded data of the magnetic tape 10, when the program start signal record button 16 is pressed, the indicator 20 lights on at step n1. At step n2, it is judged whether the repetitive reproduction section is over or not, and when it is over, the indicator 20 is turned off at step n3.

Then, at step n4, the magnetic tape 10 is rewound, and at step n5 it is judged whether the start position of the repetitive reproduction section has been detected or not, and when affirmative the magnetic tape 10 is reproduced at step n6. At step n7, it is judged whether the reproduced recording area is the planned recording area or not, and when affirmative, the operation returns to step n1 to light up the indicator 20.

Figure 5:
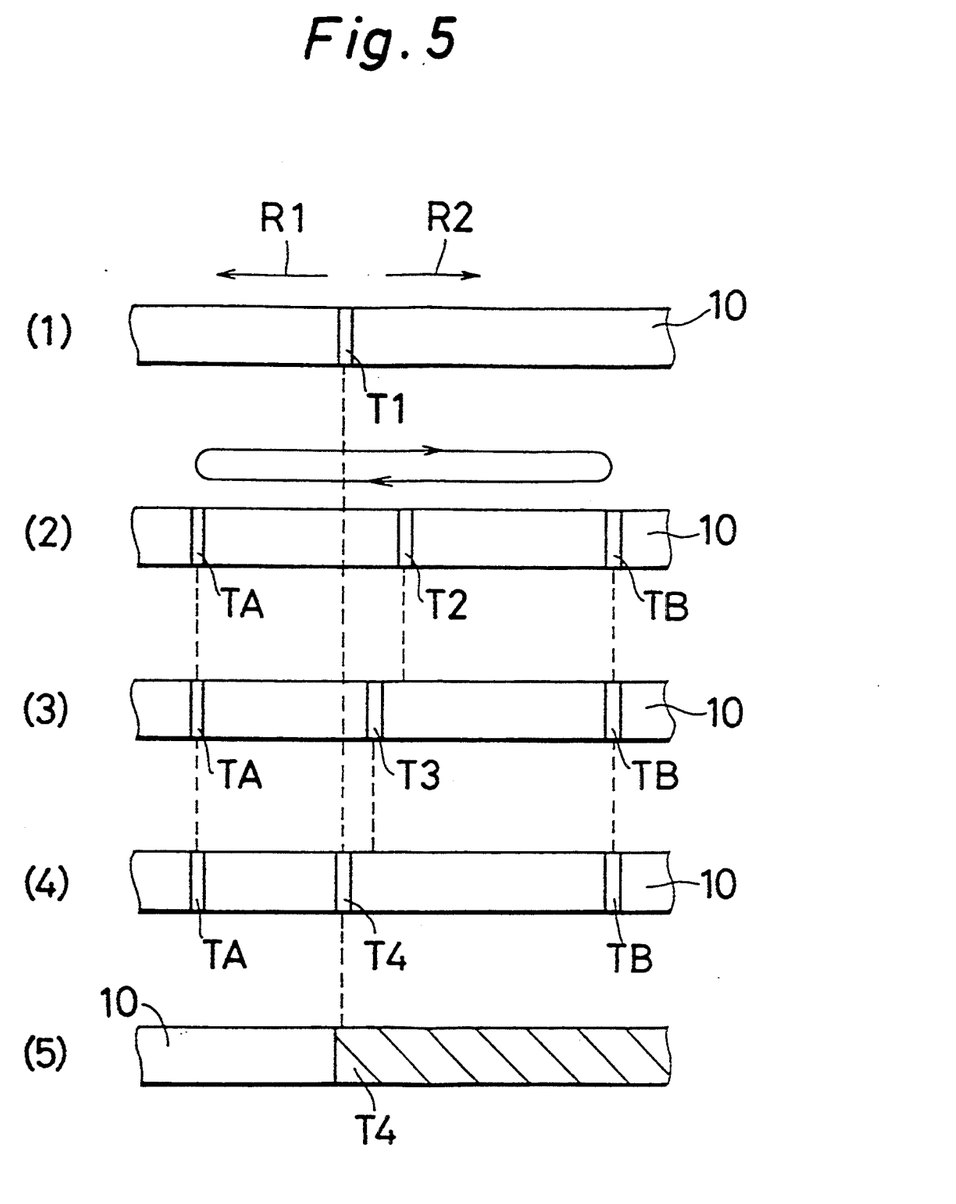
FIG. 5 is a diagram for explaining the recording action of the program start signal.

FIG. 5 is a diagram for explaining the recording of the program start signal. Referring to FIG. 5, the recording action of the program start signal is practically explained below. The magnetic tape 10 is reproduced as being driven in the direction of arrow R1 in FIG. 5 (1). In this reproduction state, when the recording area T1 in which the program start signal is desired to be added is reproduced, the program start signal record button 16 is pressed. At this time, due to the delay owing to the response time of the operator, as shown in FIG. 5 (2), actually the button 16 is pressed when reproducing the recording area T2, and the identification information of the recording area T2 is stored in the memory 7a in the controller 7. Afterwards, the repetitive reproduction is executed between the recording area TA positioned in the forward direction (the direction of arrow R1) by a predetermined number from the recording area T2, and the recording area TB positioned in the backward direction (the direction of arrow R2) by a predetermined number from the recording area T2.

The position of this recording area T2 is recognized as the planned recording area of the program start signal by the indicator 20, and it is found that it is not matched with the recording area desired by the operator, and hence correction operation is needed. In this case, the planned recording area is desired to be moved in the forward direction, and therefore the rewind button 18 is pressed once. As a result, the planned recording area moves in the forward direction by a predetermined number of recording areas as shown in FIG. 5 (3), and the recording area T3 becomes the planned recording area. Here, the planned recording area is confirmed by the indicator 20, and if the amount of shift is not enough, the rewind button 18 is pressed again. Accordingly, the planned recording are is further moved in the forward direction, and the recording area T4 becomes the planned recording area as shown in FIG. 5 (4).

Here, again, the planned recording area is confirmed by the indicator 20, and when it is matched with the recording area T1 desired by the operator, the program start signal record button 16 is pressed, and the program start signal is recorded for a specific time from the recording area T4 as shown in FIG. 5 (5).

Thus, according to the embodiment, when recording the program start signal, the recording areas before and after and including the planned recording area set when the program start signal record button 16 is pressed initially are repeatedly reproduced, and the planned recording area can be confirmed by the indicator 20, so that the configuration of the planned recording area on the magnetic tape may be clearly recognized.

Hence the planned recording area may be easily corrected, and the program start signal may be recorded from the recording area desired by the operator accurately.

The changing operation of the planned recording area may be done only by manipulating the rewind button 18 or fast forward button 19, and the planned recording area may be corrected by a simple operation, and the controllability and convenience are outstandingly enhanced.

Figure 6:
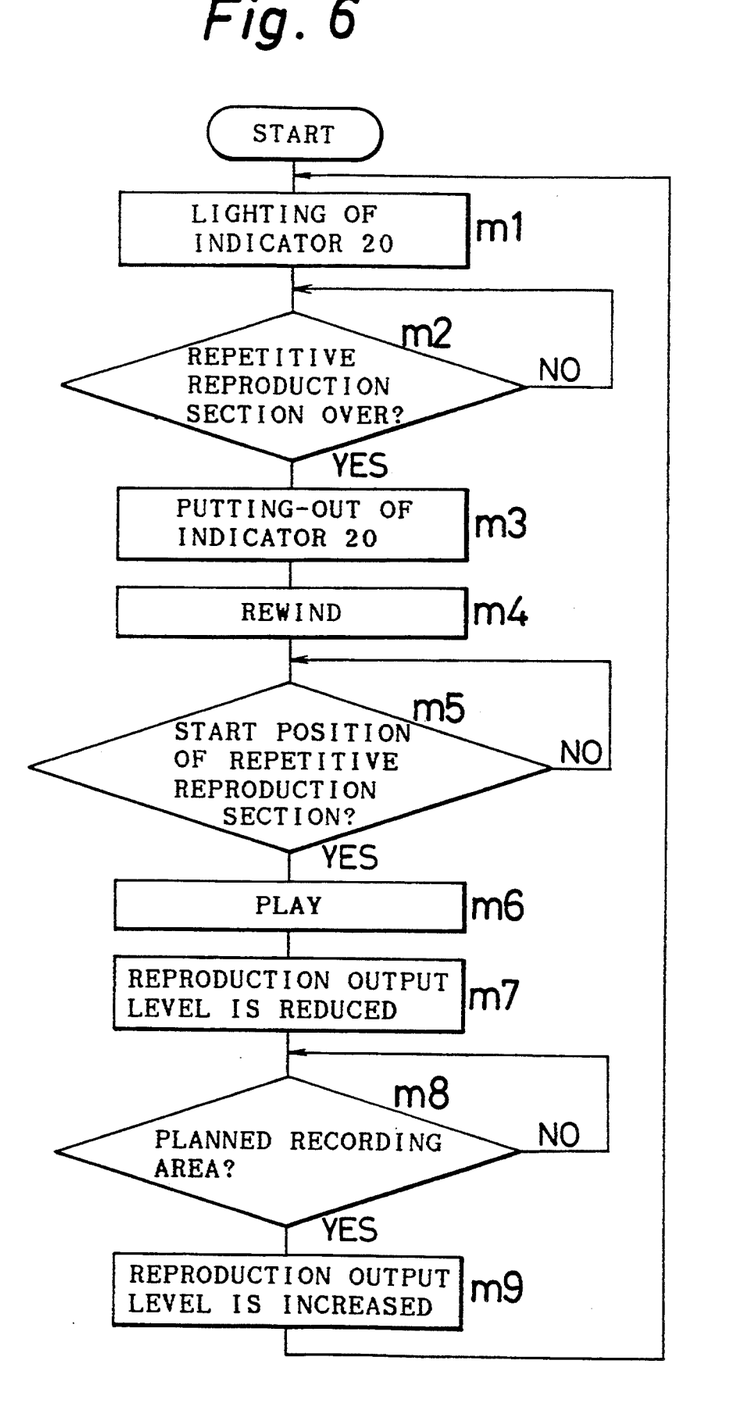
FIG. 6 is a flowchart for explaining the other repetitive reproducing action of the invention.

FIG. 6 is a flowchart for explaining the other repetitive reproduction action of the invention. The feature of this embodiment is that the output level of the reproduction signal is varied when reproducing the planned recording area in the repetitive reproduction action at step a4 in FIG. 3.

When the program start signal record button 16 is pressed during reproduction of the magnetic tape 10, the indicator 20 is lit at step m1. At step m2, it is judged whether the repetitive reproduction section is over or not, and if over the indicator 20 is turned off at step m3. Then, at step m4, the magnetic tape 10 is rewound, and it is judged whether the starting position of the repetitive reproduction section has been detected or not at step m5, and if affirmative the operation goes to step m6.

At step m6, when the data recorded on the magnetic tape 10 is reproduced, the output level of the reproduction signal is reduced and delivered at step m7. At step m8, it is judged whether the reproduced recording area is the planned recording area or not. If the judgment is affirmative, the output level of the reproduction signal is increased at step m9 to become an ordinary output, and then returning to step m1, the indicator 20 is lit up again.

Referring now to FIG. 5, the recording action of the program start signal in this embodiment is described practically below. The magnetic tape 10 is reproduced as being run in the direction of arrow R1 as shown in FIG. 5 (1). The operator presses the program start signal record button 16 when the recording area T1 in which it is desired to record the program start signal is reproduced. At this time, the operator presses the program start signal record button 16 after hearing the reproduced signal, wherein the recording area T2 is indicated as the planned recording area in view of the response time attributed to when the operator actually presses the program start signal button to set area T1 as the planned recording area. The identification information of this recording area T2 is stored in the memory 7a in the controller 7. Then the controller 7 reproduces the data by repeating the recording areas between the recording area TA located a predetermined number of recording areas before the recording area T2 and the recording area TB located a predetermined number after the recording area T2.

The recording area T2 is recognized when the reproduction output level changes and when the indicator 20 lights, and it is determined that it is not matched with the planned recording area T1 desired by the operator, and hence a correction operation is done. In this case, since it is desired to move the recording area in the forward direction, the rewind button 18 is pressed once. As a result, as shown in FIG. 5 (3), the planned recording area moves in the forward direction to reach the position of the recording area T3.

Here, again, where the reproduction output level changes and where the indicator 20 lights, the position of the recording area T3 is confirmed, and if the shift is not enough, the rewind button 18 is pressed again. As a result, the planned recording area becomes the recording area T4 as shown in FIG. 5 (4).

Likewise, where the reproduction output level changes and where the indicator 20 lights, the position of the recording area T4 is confirmed, and when it is matched with the planned recording area desired by the operator, the program start signal record button 16 is pressed. As a result, the program start signal is recorded for a specific time from the recording area T4 as shown in FIG. 5 (5).

Thus, according to the embodiment, when recording the program start signal, the recording areas before and after and including the set planned recording area are repeatedly reproduced, and the planned recording area is confirmed by lighting of the indicator 20 and change of reproduction output level, so that the configuration of the planned recording area may be easily recognized. Hence, the planned recording area may be easily corrected, and the program start signal may be accurately recorded in the position desired by the operator.

Figure 7:
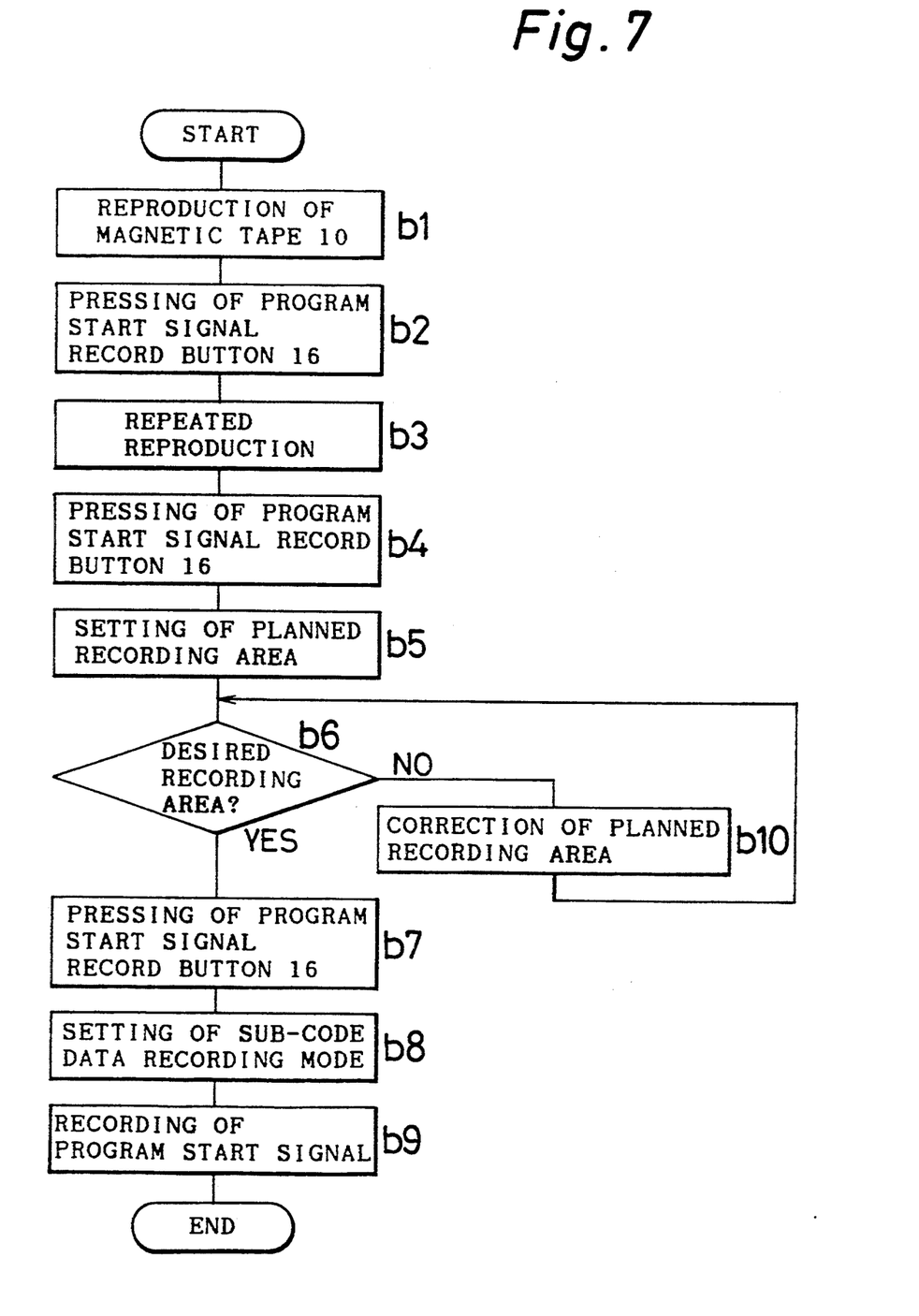
FIG. 7 is a flowchart for explaining the other recording action of the program start signal.

FIG. 7 is a flowchart for explaining another embodiment of recording of a program start signal. At step b1, the magnetic recording and reproducing apparatus 21 is loaded with a cassette tape in which the program start signal is desired to be recorded, and the play button 17 is pressed. In consequence, the controller 7 controls the servo circuit 12 and driving device 15, and the data recorded on the magnetic tape 10 is reproduced. In the reproduction state of the magnetic tape 10, the acoustic signal delivered from the reproduction output terminal 14 is monitored by a loudspeaker 24 or the like. At step b2, when the portion where it is desired to record the program start signal is reproduced, the program start signal record button 16 is pressed. At step b3, the controller 7 repeatedly reproduces the recording areas in a predetermined number including the recording area being reproduced at the time of pressing of the program start signal record button 16, for example, the number of recording areas corresponding to three seconds before and after pressing of the program start signal record button.

At step b4, during monitoring of the reproduction signals during the repetitive reproduction, when the recording position of the program start position is reproduced, the program start signal record button 16 is pressed again. At step b5, the frame address which is the identification information of the recording area which has been reproduced at the time of pressing of the program start signal record button 16 is stored in the memory 7a in the controller 7, and the indicator 20 lights momentarily, indicating that the planned recording area of the program start signal has been set. This repetitive reproduction action is executed repeatedly, and when the planned recording area of the program start signal is reproduced according to the identification information stored in the memory 7a in the controller 7, the indicator 20 is lit momentarily. Thus, the planned recording area of the program start signal that has been set can be recognized.

At step b6, when the planned recording area of the program start signal is the recording area desired by the operator, the program start signal record button 16 is pressed at step b7. At step b8, the controller 7 sets the recording mode of the Sub-code data, and controls the signal processing circuit 3 and driving device 15, for recording the Sub-code data. At step b9, the program start signal is recorded in the magnetic tape 10 for a specific time from the planned recording area.

At step b6, however, if the planned recording area of program start signal is different from the recording area desired by the operator, the planned recording area is corrected at step b10. For example, when it is desired to move the planned recording area of program start signal forward, the rewind button 18 is pressed in the repetitive reproduction action. At this time, the controller 7 recognizes the rewind button 18 as the button for moving and setting the planned recording area of program start signal in the forward direction, and every time this rewind button 18 is pressed, the identification information of the recording area positioned before by a number of recording areas corresponding to a specific time (for example, 0.3 second) is stored newly in the memory 7a in the controller 7. Here, by pressing the rewind button 18 plural times, the planned recording area is shifted by a number of recording areas corresponding to a time equal to 0.3 seconds per number of times the rewind button 18 is pressed. As a result of the manipulation above, the planned recording area of the program start signal is moved in the forward direction and set, so that the lighting timing of the indicator 20 is also moved ahead from before the correction step.

To the contrary, when desired to move the planned recording area of the program start signal in the backward direction, the fast forwarding button 19 is used. When the fast forwarding button 19 is pressed, the same action as when the rewind button 18 is pressed is conducted, and the planned recording area of the program start signal is moved in the backward direction.

Thus, by moving back and forth the planned recording area of the program start signal, the planned recording area desired by the operator can be set. Afterwards, at step b7, by pressing the program start signal record button 16, the program start signal is recorded in the magnetic tape 10 from the planned recording area same as shown above.

Figure 8:
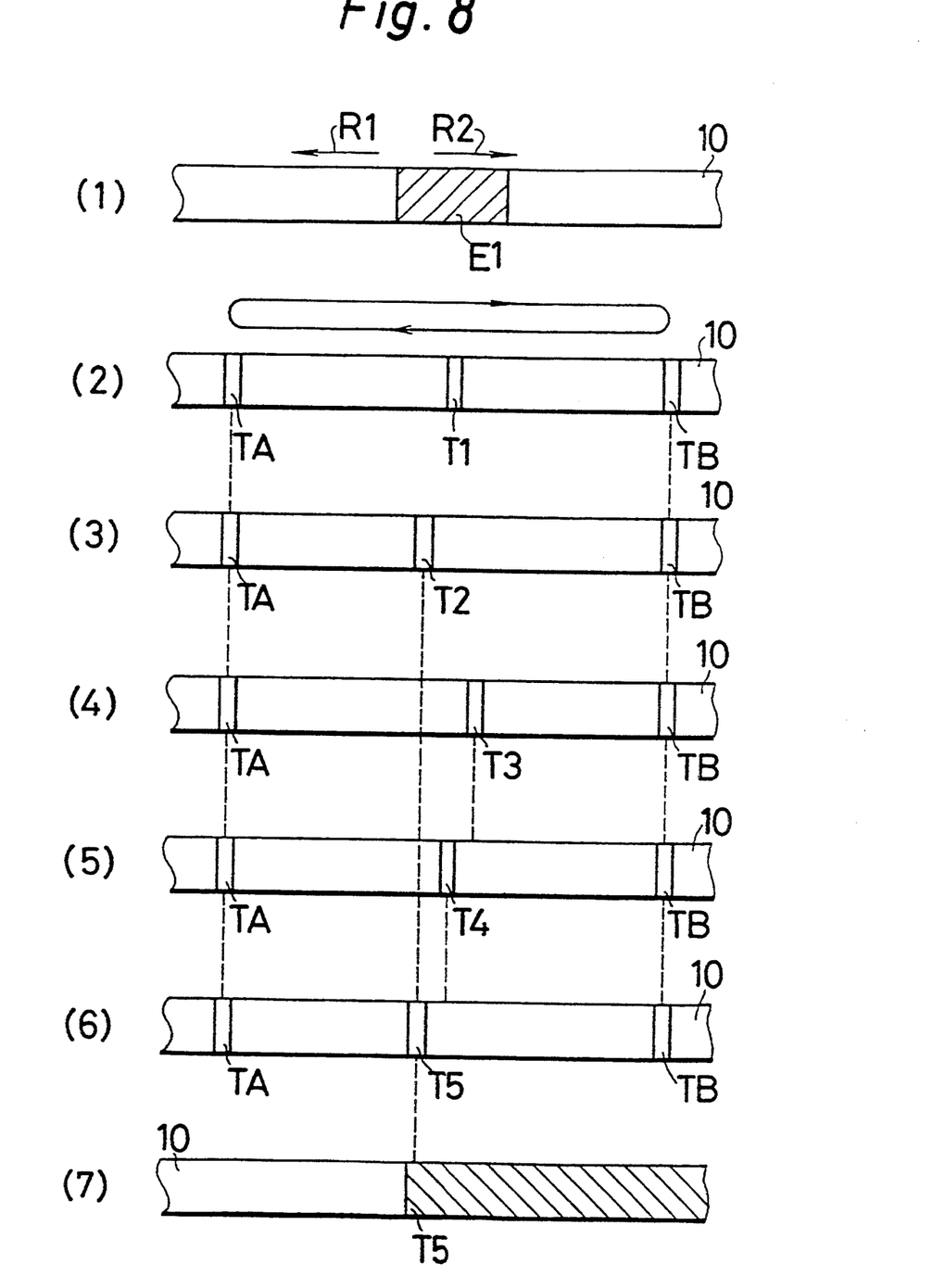
FIG. 8 is a diagram for explaining practically the recording action of the program start signal.

FIG. 8 is a diagram for explaining the recording of the program start signal explained in FIG. 7. Referring to FIG. 8, the recording action of the program start signal is described in detail below. The magnetic tape 10 is reproduced as being run in the direction of the arrow R1 as shown in FIG. 8 (1). During reproduction of the magnetic tape 10, when the portion E1 in which it is desired to additionally record the program start signal is reproduced, the program start signal record button 16 is pressed. When the position of pressing the program start signal record button 16 is, for example, in the recording area T1 as shown in FIG. 8 (2), the recording areas are repeatedly reproduced from the recording area TA, including the recording area T1, up to the recording area TB. During this repetitive reproducing, while hearing the reproduced signal, the planned recording area of the program start signal is set. Here, as shown in FIG. 8 (3), when the recording area desired by the operator is the recording area T2, since the program start signal record button 16 is pressed after hearing the reproduced signal of the recording area T2, the actual position of pressing the button is delayed by the portion of the response time from hearing the reproduced signal till pressing the button 16, and it is actually the recording area T3 as shown in FIG. 8 (4). That the recording area T3 is set as the planned recording area is confirmed by the indicator 20, and it does not coincide with the position desired by the operator, and a correction operation is needed. In this case, it is desired to move the planned recording area in the forward direction, and when the rewind button 18 is pressed once, the planned recording area moves in the forward direction by the portion of the recording areas of a predetermined number, thereby reaching the position of the recording area T4 as shown in FIG. 8 (5).

Here, again, the planned recording area is confirmed by the indicator 20, and if the shift is insufficient, the rewind button 18 is pressed again. In consequence, the planned recording area further moves in the forward direction to reach the recording area T5 as shown in FIG. 8 (6).

Likewise, the planned recording area is confirmed by the indicator 20, and when it agrees with the planned recording area T2 desired by the operator, the program start signal record button 16 is pressed. As a result, the program start signal is recorded for a specific time after the recording area T5 as shown in FIG. 8 (7).

Thus, according to the invention, when additionally recording the program start signal, since the recording areas before and after and including the planned recording areas are repeatedly reproduced, the configuration of the planned recording area may be clearly known. Therefore, the planned recording area may be easily corrected, and the program start signal may be recorded accurately in the position desired by the operator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of recording a program start signal onto a recording medium using a recording/reproducing apparatus comprising the steps of:
   (a) reproducing data recorded on the recording medium;
   (b) setting a planned recording area of the program start signal in accordance with the reproduced data;
   (c) repeatedly reproducing data recorded in the planned recording area and data recorded in a predetermined number of recording areas before and after the planned recording area;
   (d) determining if the planned recording area is correct or incorrect in accordance with said step (c) of repeatedly reproducing data;
   (e) recording the program start signal beginning from the planned recording area if the result of said step (d) of determining is that said step (b) of setting is correct;
   (f) resetting the planned recording area if the result of said step (d) of determining is that said step (b) of setting is incorrect;
   (g) repeating said step (c) of repeatedly reproducing data and said step (d) of determining for the reset planned recording area until the result of said step (d) of determining is that said step (f) of resetting is correct; and
   (h) recording the program start signal beginning from the reset planned recording area.

2. The method of recording a program start signal according to claim 1, wherein said step (c) of repeatedly reproducing data comprises displaying a representation of the data recorded in the planned recording area and the data recorded in a predetermined number of recording areas before and after the planned recording area, the data recorded in the planned recording area being highlighted.

3. The method of recording a program start signal according to claim 1, wherein said step (c) of repeatedly reproducing data comprises reproducing the data recorded in the planned recording area with a high output level and reproducing the data recorded in the recording areas before and after the planned recording area with a low output level.

4. The method of recording a program start signal according to claim 1, wherein said step (b) of setting and said step (f) of resetting respectively comprise setting a start address of the planned recording area and the reset planned recording area in memory of the recording/reproducing apparatus.

5. A method of recording a program start signal onto a recording medium using a recording/reproducing apparatus comprising the steps of:
   (a) reproducing data recorded on the recording medium;
   (b) repeatedly reproducing data recorded in recording areas of the recording medium including a recording area in which the program start signal is intended to be recorded and a predetermined number of recording areas recorded before and after the intended recording area;
   (c) setting a planned recording area of the program start signal in accordance with said step (b) of repeatedly reproducing data;
   (d) determining if the planned recording area is correct or incorrect in accordance with said step (b) of repeatedly reproducing data;
   (e) recording the program start signal beginning from the planned recording area if the result of said step (d) of determining is that said step (c) of setting is correct;
   (f) resetting the planned recording area if the result of said step (d) of determining is that said step (c) of setting is incorrect;
   (g) repeating said step (d) of determining and step (f) of resetting for the reset planned recording area until the result of said step (d) of determining is that said step (f) of resetting is correct; and
   (h) recording the program start signal beginning from the reset planned recording area.

6. The method of recording a program start signal according to claim 5, wherein said step (b) of repeatedly reproducing data comprises displaying a representation of the data recorded in the intended recording area and the data recorded in a predetermined number of recording areas before and after the intended recording area, the data recorded in the intended recorded area being highlighted.

7. The method of recording a program start signal according to claim 5, wherein said step (b) of repeatedly reproducing data comprises reproducing the data recorded in the intended recording area with a high output level and reproducing the data recorded in the recording areas before and after the intended recording area with a low output level.

* * * * *